UNITED STATES PATENT OFFICE.

JAMES WHITEHILL, OF FREDERICK, MARYLAND.

IMPROVEMENT IN FERTILIZERS.

Specification forming part of Letters Patent No. 138,458, dated April 29, 1873; application filed April 3, 1873.

*To all whom it may concern:*

Be it known that I, JAMES WHITEHILL, of Frederick, in the county of Frederick and State of Maryland, have invented a new and Improved Fertilizing Material; and I do hereby declare the following to be a full, clear, and exact description of the same.

The invention relates to modes of preparing lime so that it may be applied as a fertilizer or stimulant to the soil, with economy in the application in the most active and efficient form and with the greatest evenness in the distribution.

Hitherto lime has been burnt and allowed to become air-slaked previous to use. A large proportion of the bulk is formed in lumps of greater or less dimensions. This is very objectionable to the farmer, inasmuch as it will not pass the drill without being sifted. The latter is a disagreeable and unpleasant operation, while, if the lumps are not removed the distribution will be so uneven as to leave many bald places in the fields.

As lime forms but a very minute proportion of the ash of the plant, and but a mere trace is found in the grain, and as its principal action is exerted upon the vegetable matter in the soil to place it in a state of solubility, it is very expedient to apply it at short intervals, and in comparative small quantities. This is, however, impossible when furnished in the usual lumpy form. I therefore grind the caustic lump-lime to a sand state, and place it in barrels or other packages, which may be obtained from any agricultural ware-house by the farmer. This powder can then be taken from the package and distributed at once upon the land through the drill with ease, absolute uniformity, and in much less quantity than heretofore; being in a caustic state, and very minutely subdivided, it acts on the vegetable matter at once and with facility permeates the soil evenly in all parts, and makes as prompt a return for the farmer's outlay as guano, bone-dust, or any other fertilizer.

Having thus described my invention, what I claim as new, and desire to secure by Letters Patent, is—

1. A barrel or other package of caustic lime ground to the sand state, as and for the purpose described.

2. The process of preparing unslaked lime by burning and grinding it for agricultural purposes, in the manner set forth.

JAMES WHITEHILL.

Witnesses:
SOLON C. KEMON,
CHAS. A. PETITT.